United States Patent [19]

Meininger et al.

[11] 3,925,351
[45] Dec. 9, 1975

[54] WATER-SOLUBLE REACTIVE MONOAZODYESTUFFS

[75] Inventors: Fritz Meininger; Ernst Hoyer, both of Frankfurt am Main; Hermann Fuchs, Kelkheim, all of Germany

[73] Assignee: Hoechst Aktiengesellschaft, Frankfurt am Main, Germany

[22] Filed: Dec. 18, 1972

[21] Appl. No.: 316,251

[30] Foreign Application Priority Data

Dec. 21, 1971 Germany.............................. 2163389

[52] U.S. Cl. ................ 260/196; 260/198; 260/508; 260/509
[51] Int. Cl.² .................... C09B 29/06; C09B 29/30; D06P 1/38; D06P 3/66
[58] Field of Search............................ 260/196, 198

[56] References Cited
UNITED STATES PATENTS

| | | | |
|---|---|---|---|
| 3,135,730 | 6/1964 | Heyna et al.......................... | 260/147 |
| 3,414,579 | 12/1968 | Remy.............................. | 260/162 X |
| 3,462,409 | 8/1969 | Meininger.......................... | 260/147 |
| 3,553,189 | 1/1971 | Sugiyama et al.................... | 260/198 |
| 3,649,615 | 3/1972 | Ikeda et al.......................... | 260/199 |

*Primary Examiner*—Floyd D. Higel
*Attorney, Agent, or Firm*—Curtis, Morris & Safford

[57] ABSTRACT

Water-soluble reactive azo dyestuffs of the formula (1)

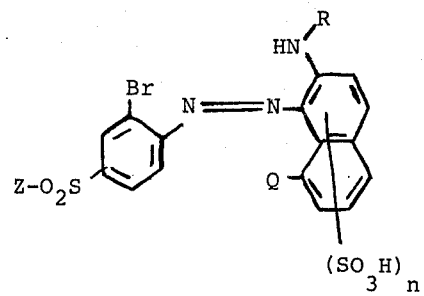

wherein R represents a hydrogen atom or a lower alkyl radical a cyclohexyl radical or a phenyl radical, Q represents a hydrogen atom or a hydroxyl group and Z stands for one of the groupings (2a), (2b) or (2c)

$-CH_2-CH_2-OSO_3H$ (2a)
$-CH=CH_2$ (2b)
$-CH_2-CH_2-OH$ (2c)

and n stands for the integer 1 or 2, which are very suitable for dyeing and printing materials made of natural cellulose fibers, particularly cotton, regenerated cellulose fibers, linen, silk, polyamide and polyurethane fibers, especially wool, preferably utilized according to the technically usual dyeing and printing processes for reactive dyestuffs. They posses an excellent affinity towards wool fibers and they are dyed from an acid, weakly acid or neutral dyeing bath at 70°C to 120°C. They are distinguished by a very good color build-up, a good levelness of the dyeings, very good fastnesses to processing and very good fastnesses to use, also on chlorinated wool. A particular characteristic of these dyestuffs is the very good suitability for the preparation of combination dyeings in mixtures with other dyestuffs on account of the fact that the rate of absorption from the dyeing bath on the wool fiber can be controlled by the pH value of the dyebath.

6 Claims, No Drawings

WATER-SOLUBLE REACTIVE MONOAZODYESTUFFS

The present invention relates to new water-soluble reactive azo dyestuffs corresponding to the general formula (1)

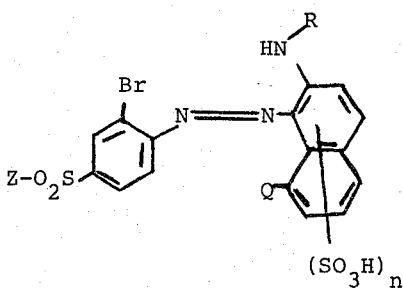

wherein R represents a hydrogen atom or a lower alkyl radical of 1–4 carbon atoms, preferably the methyl or ethyl radical, cycloalkyl radicals such as, for example the cyclohexyl radical, or aryl radicals such as, for example, the phenyl or a lower alkylphenyl radical, Q represents a hydrogen atom or a hydroxyl group, Z stands for one of the following groups $-CH_2-CH_2-OSO_3H$ (2a),
$-CH=CH_2$ (2b) or
$-CH_2-CH_2-OH$ (2c)

and n stands for the integer 1 or 2.

The present invention also provides a process for preparing these dyestuffs which comprises diazotizing amines of the general formula (3)

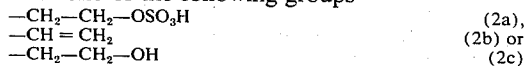

wherein Z has the aforementioned meaning, in the usual and known manner and coupling them in a strongly to weakly acid pH range with 2-amino naphthalene-sulfonic acids of the general formula

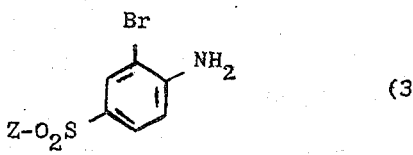

wherein Q, n and R have the aforementioned meanings.

The azo dyestuffs of the general formula (1) with the reactive radical in which Z stands for the formula (2a) may also be prepared according to the invention by diazotizing the 1-amino-2-brombenzene-4-β-hydroxyethylsulfone, coupling it with the coupling components of the formula (4) and converting the azo dyestuff of the formula (1) thus obtained with the grouping of formula (2c), in concentrated sulfuric acid or in a mixture of pyridine and amido sulfonic acid into the corresponding sulfuric acid ester dyestuff having the grouping of formula (2a).

The dyestuff of the formula (1) with the grouping of the formula (2a) may be converted into a dyestuff with the reactive radical of the formula (2b) by treating it in an aqueous solution with strongly alkaline agents, adjusting the pH to a neutral or weakly alkaline value by adding mineral acid, and isolating the dyestuff.

Thus, for example, when preparing the vinyl compound having the grouping of the formula (2b), the alkali salt of the sulfuric acid ester is dissolved in water, the pH is adjusted to a value of 8 – 14, preferably 11 – 13, by means of a strongly inorganic base, preferably sodium hydroxide solution, and the solution is heated to 30°C – 50°C within 2 to 10 minutes until the pH no longer decreases. The sodium salt can be obtained by neutralizing the solution with hydrochloric acid and salting out with sodium or potassium chloride or by spraydrying the neutralized solution.

The diazotization of 1-amino-2-bromobenzene-4-β-hydroxyethylsulfone, the corresponding sulfuric acid ester or the 1-amino-2-bromobenzene-4-vinylsulfone is effected, in an aqueous solution or suspension of a mineral acid at a temperature of from 0° – 20°C, the coupling of the aforementioned 2-naphthylaminosulfonic acid of the formula (4) is effected at 0° – 25°C within a pH range of from 1.0 – 4.0, preferably from 1,5 to 2,5.

The dyestuffs of the present invention are isolated after neutralization of the coupling mixture — the pH being adjusted to a value of from 5.0 – 6.5 — by salting out with electrolytes or spray-drying.

The new monoazo dyestuffs of the aforementioned general formula (1) are very suitable for dyeing and printing various materials, such as, for example, natural cellulose fibers, particularly cotton, regenerated cellulose fibers, linen, silk, polyamide and polyurethane fibers, especially, however, wool. They can be preferably utilized according to the technically usual dyeing and printing processes for reactive dyestuffs.

The new dyestuffs of the present invention possess an excellent affinity towards wool fibers. They can be dyed from an acid, for example sulfuric acid, weakly acid or neutral dyeing bath, preferably at a pH ranging from 4,5 – 5,5, at 70° – 120°C, preferably 95° – 100°C, if desired in the presence of the sodium salt of β-N-methyl-aminoethane-sulfonic acid and further auxiliaries usual in the dyeing practice such as, for example, sodium sulfate or ammonium sulfate, and wetting or leveling agents such as, for example, fat alcohol or fatty amine polyglycol ethers. The pH value of the dyeing bath can be increased to 7.5 – 8.5 at the end of the dyeing process by adding agents having an alkaline effect, such as tertiary sodium phosphate or an aqueous ammonia solution. The new dyestuffs of the present invention are distinguished by a very good color build up, a good levelness of the dyeings, very good fastnesses to processing, such as, for example, to decatizing, fulling and potting, and very good fastness to use, such as washing, a fastness to acid and alkaline perspiration, and very good fastness to light, also on chlorinated wool. A particular characteristic of these dyestuffs is the very good suitability for the preparation of combination dyeings in mixtures with other dyestuffs on account of the fact that the rate of absorption from the dyeing bath on the wool fiber can be controlled by the pH value of the dyebath.

In comparison with dyestuffs known in the art which have a hydrogen atom instead of a bromine atom in the diazo component, the dyestuffs of the present invention have a higher tinctorial strength, produce purer shades and have better fastness to light.

The following Examples serve to illustrate the invention, the parts being by weight unless stated otherwise and the relationship between parts by weight and parts by volume is as grams to cubic centimeters.

EXAMPLE 1

36.0 Parts of 1-amino-bromobenzene-4-β-hydroxyethylsulfonesulfuric acid ester were dissolved with 5.5 parts of calcinated sodium carbonate in 150 parts by volume of water (the whole having a pH = 6.5 – 7.0); 20 parts by volume of a 5N-sodium nitrite solution were added to the solution and the whole was slowly poured into a well stirred mixture of 25 parts of hydrochloric acid of 37% strength and 120 parts of ice. Stirring was continued for 15 minutes at a positive nitrate reaction. After decomposition of the nitrous acid in excess with a small quantity of amidosulfonic acid, 23.9, parts of finely pulverized 2-amino-8-naphthol-6-sulfonic acid were added and the pH of the coupling mixture was adjusted to 1,5 – 1,6 by dropwise adding a 20% solution of sodium acetate. Stirring of the coupling mixture was continued for 10 hours, and the mixture was then neutralized with calcinated sodium carbonate to a pH of 6. The dyestuff was separated by the addition of 20% sodium chloride calculated on the volume of the solution, suction-filtered and dried. A dark-red dyestuff powder was obtained which dyed wool from an acetic acid bath claret shades having very good fastnesses to wet processing and light.

Constitution of the dyestuff:

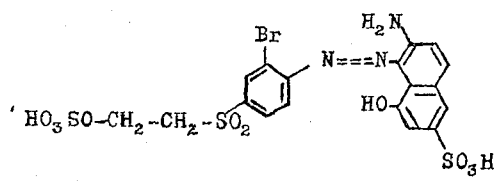

EXAMPLE 2

26.2 Parts of 1-amino-2-bromobenzene-4-vinylsulfone were dissolved in 150 parts by volume of water with 25 parts of 37% hydrochloric acid, 50 parts of ice were added to the solution and the whole was diazotized by the addition of 20 parts by volume of a 5N-sodium nitrite solution. Stirring was continued for 15 minutes at a positive nitrite reaction and the nitrous acid in excess was decomposed with a small quantity of amidosulfonic acid. 22.3 Parts of 2-aminonaphthalene-5-sulfonic acid were added to the diazo solution and the pH of the reaction mixture was first adjusted to 1,5 by strewing in crystallized sodium acetate and, after 2 hours, to 2,5 by strewing in sodium bicarbonate. After stirring for 2 hours, the mixture was neutralized with calcinated sodium bicarboante to pH of 6.0 and the dyestuff was salted out by adding 20% sodium chloride calculated on the volume of the solution, suction-filtered and dried.

A red powder was obtained which dyed wool from a weakly acid solution scarlet tints possessing a very good fastness to washing, decatizing and potting and a good to very good fastness to light.

The dyestuff corresponded to the following formula:

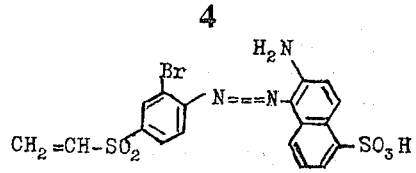

EXAMPLE 3

28.0 Parts of 1-amino-2-bromobenzene-4-β-hydroxyethylsulfone were dissolved in 150 parts by volume of water with 25 parts of 37% hydrochloric acid, 50 parts of ice were added to the solution and the whole was diazotized by the addition of 20 parts by volume of a 5N-sodium nitrite solution. Stirring was continued for 15 minutes at a positive nitrite reaction and the nitrous acid in excess was decomposed with a small quantity of amidosulfonic acid. 23.7 Parts of 2-N-methylaminonaphthalene-7 sulfonic acid were added to the diazo solution and the pH of the coupling mixture was first adjusted to 1.5 with crystallized sodium acetate and, after stirring for 1 – 2 hours, to 2.5 with sodium bicarbonate. After a reaction time of 7 hours, the mixture was neutralized with calcinated sodium carbonate until the pH value was 6.5 and the dyestuff was salted out with 15% sodium chloride calculated on the volume of the solution, suction-filtered and dried. The dried dyestuff powder was introduced at room temperature into 3½-fold-amount by weight of 96% sulfuric acid. The mixture was stirred for 12 hours at room temperature, thereafter it was stirred into 500 parts of ice and calcium carbonate was gradually added to the mixture at 15° – 20°C until a pH value of 2.5 was reached; the whole was then neutralized with calcinated sodium chloride up to a pH-value of 6.5, the precipitated calcium sulfate was separated by suction-filtration and the dyestuff in the filtrate was salted out by strewing in 20% sodium chloride calculated on the volume of the solution. After filtration and drying there was obtained a red dyestuff powder which dyed wool bright bluish red tints possessing very good fastnesses to wet processing and a good fastness to light.

The dyestuff corresponded to the following formula

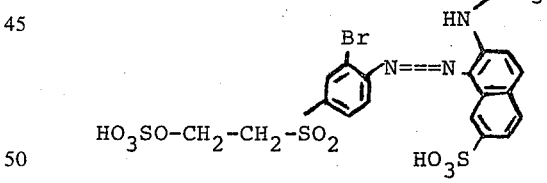

An analogous dyestuff of the above formula which, however, had as reactive group a vinylsulfone group instead of the β-sulfatoethylsulfone group and corresponded to the formula

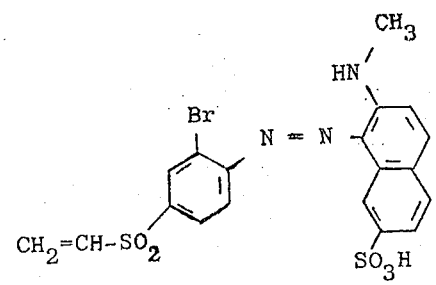

was prepared by adding concentrated sodium hydroxide solution at 30° – 40°C to the solution of the sulfuric acid ester dyestuff of the formula mentioned in this example until the pH value of 12 remained constant for 3 minutes, and adding mineral acid or acetic acid until a pH value of 5 – 6 was reached. The vinylsulfone dyestuff of the above formula was then isolated by salting out.

The dyestuff yielded on the polyamide fiber in printing pastes with the usual thickening agents and in the presence of sodium acetate a clear bluish red possessing a good fastness to light and good fastnesses to wet processing.

The following Table contains further dyestuffs prepared according to one of the aforementioned methods.

| 4 | 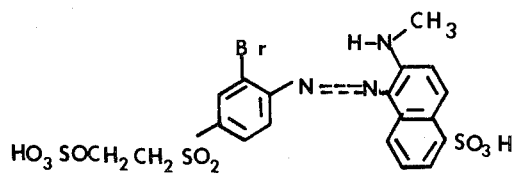 | Yellowish red. |
|---|---|---|
| 5 | 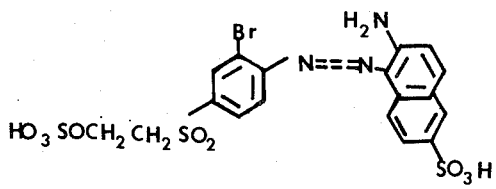 | Yellowish red. |
| 6 | 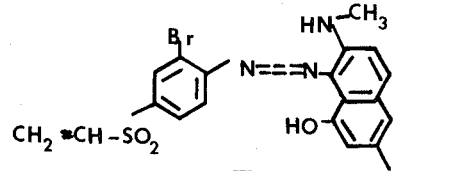 | Bordo. |
| 7 | 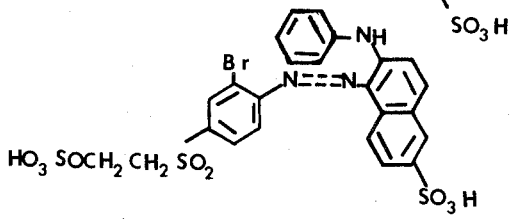 | Bluish red. |
| 8 | 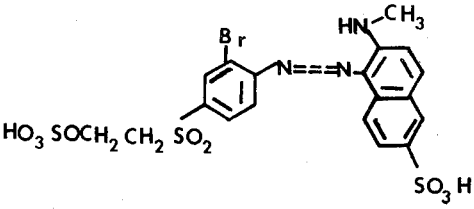 | Bluish red. |
| 9 | 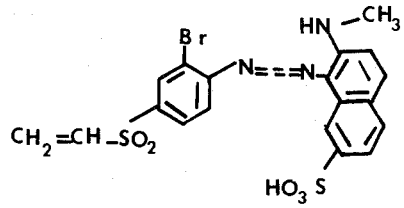 | Bluish red. |
| 10 | 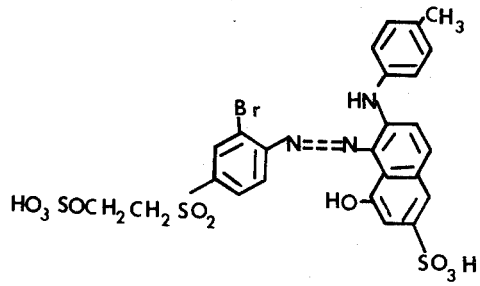 | Bordo. |

| | | |
|---|---|---|
| 11 | 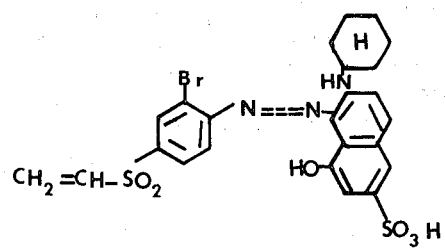 | Bordo. |
| 12 | 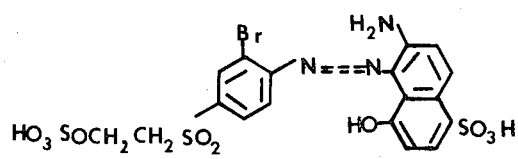 | Bluish red. |
| 13 | 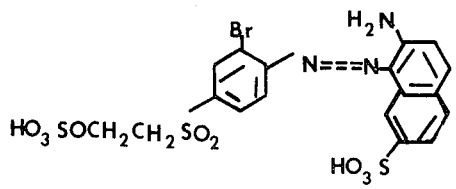 | Red. |
| 14 | 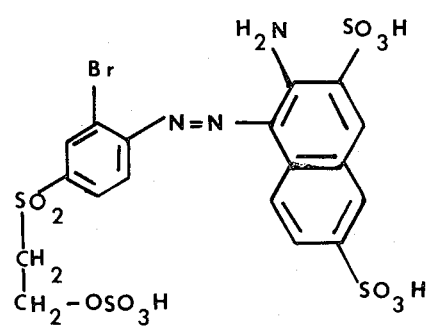 | Yellowish red. |
| 15 | 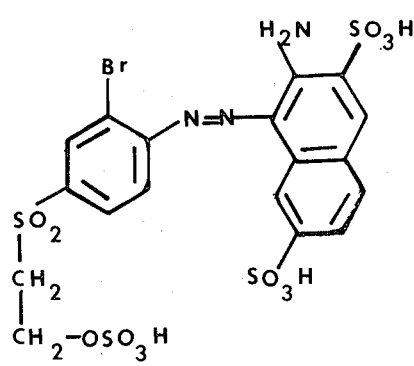 | Yellowish red. |
| 16 | 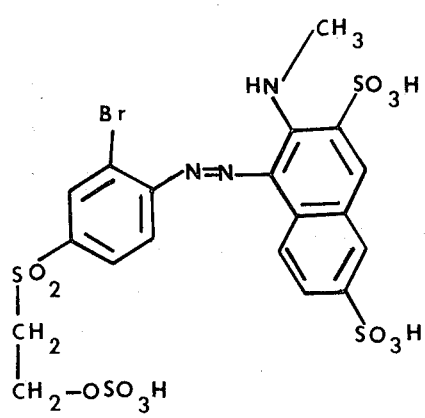 | Red. |

We claim:
1. Water-soluble azo dyestuff of the formula

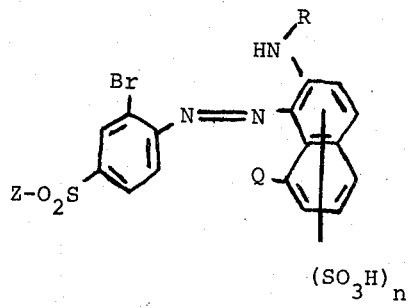

wherein R is hydrogen, lower alkyl, cyclohexyl or phenyl, Q is hydrogen, or hydroxy, Z is
 —CH$_2$—CH$_2$—OSO$_3$H
 —CH=CH$_2$ or
 —CH$_2$—CH$_2$—OH
and $n$ is 1 or 2.

2. A dyestuff as claimed in claim 1 of the formula

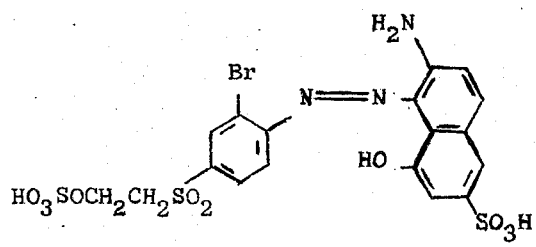

3. A dyestuff as claimed in claim 1, of the formula

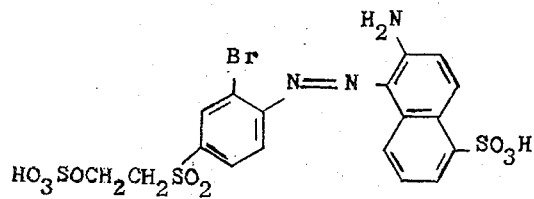

4. A dyestuff as claimed in claim 1, of the formula

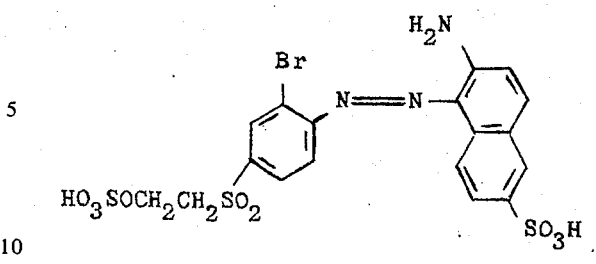

5. A dyestuff as claimed in claim 1, of the formula

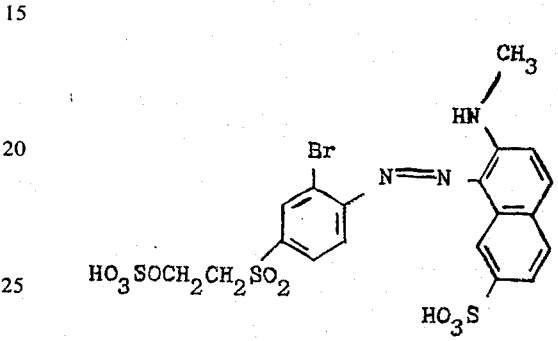

6. A dyestuff as claimed in claim 1, of the formula

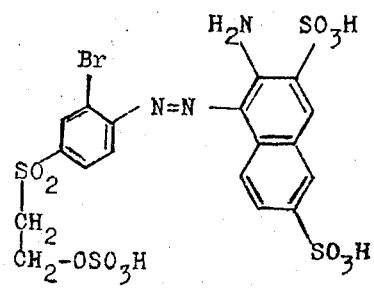

* * * * *